US012791895B2

(12) United States Patent
(10) Patent No.: US 12,791,895 B2
(45) Date of Patent: Nov. 10, 2026
Shen et al.

(54) REFLECTIVE ELEMENT

(71) Applicant: DARWIN PRECISIONS CORPORATION, Hsinchu County (TW)

(72) Inventors: Wen-Tai Shen, Hsinchu County (TW); Yu-Cheng Chang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 312 days.

(21) Appl. No.: 18/583,771

(22) Filed: Feb. 21, 2024

(65) Prior Publication Data

US 2025/0028201 A1 Jan. 23, 2025

(30) Foreign Application Priority Data

Jul. 19, 2023 (TW) ................................ 112126925

(51) Int. Cl.
*G02F 1/13357* (2006.01)

(52) U.S. Cl.
CPC .............................. *G02F 1/133605* (2013.01)

(58) Field of Classification Search
None
See application file for complete search history.

(56) References Cited

U.S. PATENT DOCUMENTS

2002/0039292 A1* 4/2002 Matsui .............. G02F 1/133605 362/348
2003/0058635 A1* 3/2003 Matsui .................... G09F 13/14 362/241
2018/0217449 A1* 8/2018 Mifune ............ G02F 1/133605
2019/0319176 A1 10/2019 Sato
2022/0206339 A1* 6/2022 Sun ................... G02F 1/133605
2022/0221760 A1* 7/2022 Dai ................... G02F 1/133605
2022/0236609 A1* 7/2022 Zhang ............... G02F 1/133603
2024/0280243 A1 8/2024 Kusunoki
2025/0076704 A1* 3/2025 Chi ....................... G02F 1/1336

FOREIGN PATENT DOCUMENTS

CN 105065976 A 11/2015
CN 107329321 A 11/2017
CN 112859446 A * 5/2021 ....... G02F 1/133606

(Continued)

*Primary Examiner* — Shan Liu

(57) ABSTRACT

A reflective element is adapted to a backlight module including a plurality of light-emitting elements. The reflective element includes a body provided with a top surface, a bottom surface, and a plurality of light source grooves. Each light source groove is provided with a light outlet, a bottom, and a reflective portion. The light outlet is formed on the top surface. The bottom is adapted to arrange the light-emitting element. The reflective portion is located between the light outlet and the bottom and is adapted to surround the light-emitting element. The reflective portion includes a first reflective surface and a second reflective surface. The first reflective surface is located between the second reflective surface and the bottom, and the second reflective surface is located between the first reflective surface and the light outlet. The first reflective surface and the second reflective surface have different slopes or curvatures.

3 Claims, 7 Drawing Sheets

(56) References Cited

FOREIGN PATENT DOCUMENTS

| | | | | |
|---|---|---|---|---|
| CN | 115016175 | A | | 9/2022 |
| JP | 2002032029 | A | * | 1/2002 |
| TW | 1240122 | B | | 9/2005 |
| TW | 201032348 | A1 | | 9/2010 |
| TW | M596875 | U | * | 6/2020 |
| TW | 202024693 | A | | 7/2020 |

* cited by examiner

REFLECTIVE ELEMENT

FIELD OF THE INVENTION

The present invention relates to a reflective element, and particularly relates to a reflective element adapted to a backlight module.

BACKGROUND OF THE INVENTION

A liquid crystal display mainly includes a backlight module, a display panel, and an outer frame. In detail, the backlight module can also be divided into a side-light type backlight module and a direct type backlight module, wherein an area source of the direct type backlight module has the advantage of uniform brightness and contributes to achieving a local dimming function, so that an image has better contrast. Therefore, most large liquid crystal displays with light-emitting diode (LED) as a light source adopt the direct type backlight module.

However, a known backlight module cannot effectively control the light-emitting angle of a light-emitting element. Therefore, when the known backlight module executes the local dimming function, rays emitted from a bright area will interfere with the adjacent dark area to affect the display effect of the dark area and induce a reduction of the contrast of the image.

SUMMARY OF THE INVENTION

The present invention provides a reflective element adapted to a backlight module, with the advantages of a small light-emitting angle and uniform light-emitting brightness.

The reflective element provided by the present invention is adapted to the backlight module. The backlight module includes a plurality of light-emitting elements. The reflective element includes a body. The body is provided with a top surface, a bottom surface, and a plurality of light source grooves. The top surface is opposite to the bottom surface. Each of the light source grooves is provided with a light outlet, a bottom, and a reflective portion. The light outlet is located on the top surface. The bottom is opposite to the light outlet and is adapted to arrange the light-emitting element. The reflective portion is located between the light outlet and the bottom and is adapted to surround the light-emitting element. The reflective portion includes a first reflective surface and a second reflective surface. The first reflective surface is located between the second reflective surface and the bottom, and the second reflective surface is located between the first reflective surface and the light outlet. A slope of the first reflective surface relative to the bottom surface is different from a slope of the second reflective surface relative to the bottom surface, or a curvature of the first reflective surface is different from a curvature of the second reflective surface.

In an embodiment of the present invention, the first reflective surface and the second reflective surface each include a plane, and the slope of the first reflective surface is less than the slope of the second reflective surface.

In an embodiment of the present invention, the slope of the first reflective surface is, for example, between 0 and 1.5.

In an embodiment of the present invention, the second reflective surface may be adjacent to the light outlet, and the second reflective surface is perpendicular to the bottom surface.

In an embodiment of the present invention, the reflective portion may further include a third reflective surface located between the first reflective surface and the second reflective surface. A slope of the third reflective surface is different from the slope of the first reflective surface and the slope of the second reflective surface.

In an embodiment of the present invention, the third reflective surface may be adjacent to the first reflective surface and the second reflective surface, and the slope of the third reflective surface is greater than or less than the slope of the first reflective surface and the slope of the second reflective surface.

In an embodiment of the present invention, the first reflective surface and the second reflective surface each may include a curved surface, and a curvature of the second reflective surface is less than a curvature of the first reflective surface.

In an embodiment of the present invention, the reflective portion, for example, further includes a third reflective surface. The third reflective surface is located between the second reflective surface and the light outlet and is adjacent to the light outlet. The third reflective surface is perpendicular to the bottom surface.

In an embodiment of the present invention, the bottom portion may have a reflective surface. The reflective surface has an opening facing the light outlet and the opening is adapted to arrange the light-emitting element. The first reflective surface is located between the second reflective surface and the reflective surface. The reflective surface is parallel to the bottom surface, or the curvature of the first reflective surface is less than the curvature of the second reflective surface and the curvature of the reflective surface.

In an embodiment of the present invention, there may be a distance between the two adjacent light outlets in the light outlets on the top surface, and the distance is between 0.01 mm and 2 mm.

In an embodiment of the present invention, an area of the top surface between the adjacent two light outlets may have a plane. The plane is adjacent to the two reflective portions of the two adjacent light source grooves, and a sharp corner is formed between the plane and each of the two reflective portions.

In an embodiment of the present invention, the top surface, for example, includes a curved surface located between the two adjacent light outlets in the light outlets. A curvature diameter of the curved surface is located between 0.01 mm and 2 mm.

In an embodiment of the present invention, the bottoms of the light source grooves each may be provided with an opening. The opening faces the light outlet and is adapted to have the light-emitting element arranged thereon, and the shape of the opening includes a circle or a quadrangle.

According to the reflective element provided by the present invention, the first reflective surface and the second reflective surface surround the light-emitting element of the backlight module, wherein the slope of the first reflective surface is different from the slope of the second reflective surface, and the curvature of the first reflective surface is different from the curvature of the second reflective surface. Therefore, a light beam generated by the light-emitting element can be emitted from the light outlet at an approximately forward light-emitting angle after being reflected by the first reflective surface and the second reflective surface, so that the rays emitted from the light outlets are prevented from interfering with each other. Based on the above structure, the reflective element provided by the present invention has the advantages of a small light-emitting angle and uniform light-emitting brightness.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
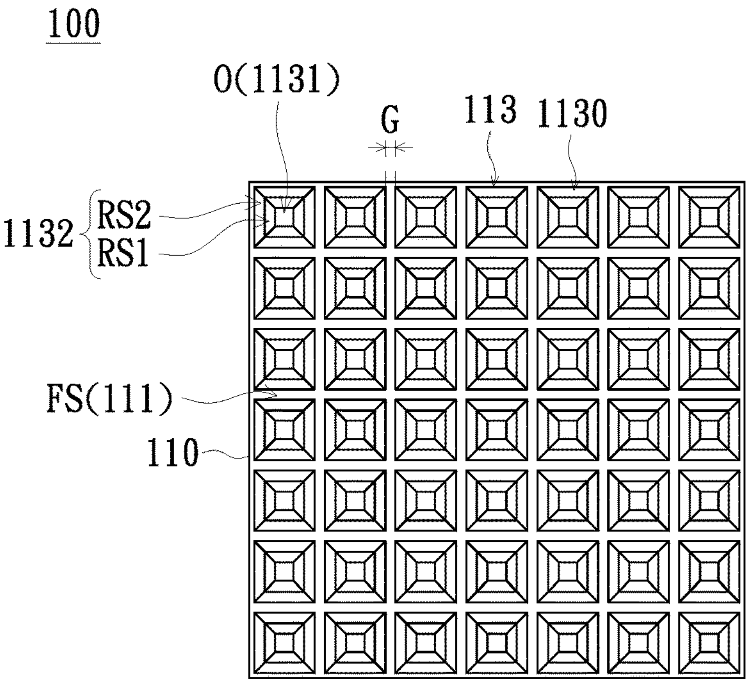
FIG. 1 is a schematic top view of a reflective element in an embodiment of the present invention.
Figure 2:
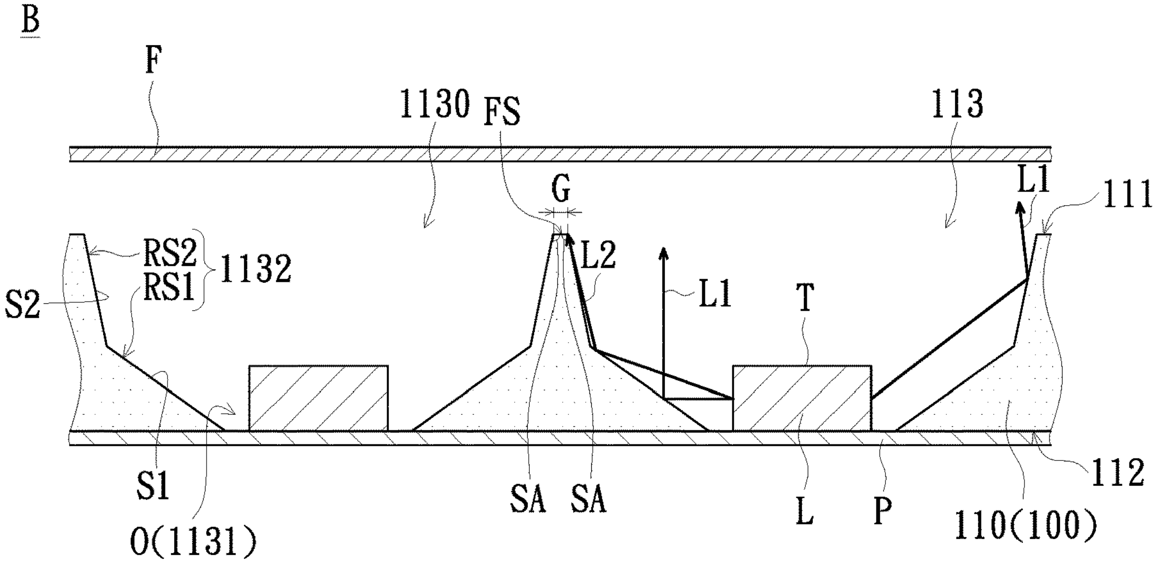
FIG. 2 is a schematic cross-sectional view of the reflective element in FIG. 1 applied to a backlight module.

FIG. 1 is a schematic top view of a reflective element in an embodiment of the present invention. FIG. 2 is a schematic cross-sectional view of the reflective element in FIG. 1 applied to a backlight module. As shown in FIG. 1 and FIG. 2, the reflective element 100 is adapted to a backlight module B. The backlight module B includes a plurality of light-emitting elements L. The reflective element 100 includes a body 110. The body 110 is provided with a top surface 111, a bottom surface 112 (shown in FIG. 2), and a plurality of light source grooves 113. The top surface 111 is opposite to the bottom surface 112. Each of the light source grooves 113 is provided with a light outlet 1130, a bottom 1131, and a reflective portion 1132. The light outlet 1130 is located on the top surface 111. The bottom 1131 is opposite to the light outlet 1130 and is adapted to arrange the light-emitting element L. The reflective portion 1132 is located between the light outlet 1130 and the bottom 1131 and is adapted to surround the light-emitting element L. The reflective portion 1132 includes a first reflective surface RS1 and a second reflective surface RS2. The first reflective surface RS1 is located between the second reflective surface RS2 and the bottom 1131, and the second reflective surface RS2 is located between the first reflective surface RS1 and the light outlet 1130. The slope of the first reflective surface RS1 relative to the bottom surface 112 is different from the slope of the second reflective surface RS2 relative to the bottom surface 112.

The body 110 may be formed by curing a reflective adhesive. Further, the above reflective adhesive may be subjected to injection molding or hot press molding to form the shape of the body 110 and form the first reflective surface RS1 and the second reflective surface RS2 jointly. For example, a material of the reflective adhesive may include polyethylene terephthalate (PET), polyethylene (PE) or polycarbonate (PC), which is not limited herein. In an embodiment, the body 110 may include a plurality of reflector plates which may be connected one another to form the first reflective surface RS1 and the second reflective surface RS2. Further, a material of the reflector plates may include, for example, silver, which is not limited herein. In another embodiment, the first reflective surface RS1 and the second reflective surface RS2 may be formed by a reflective layer arranged on the body 110. However, the present invention does not over-limit the materials and the manufacturing procedures of the body 110, the first reflective surface RS1, and the second reflective surface RS2.

Figure 3:
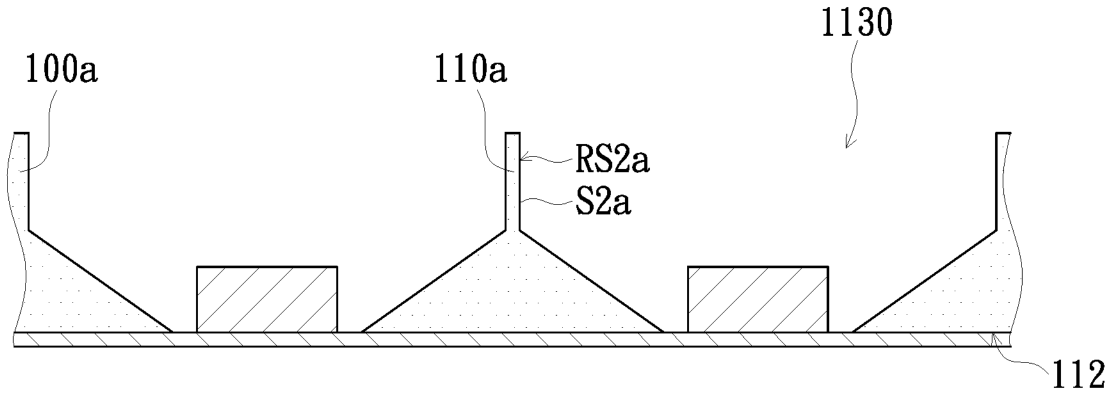
FIG. 3 is a schematic cross-sectional view of a reflective element in another embodiment of the present invention applied to a backlight module.

In the embodiment, the first reflective surface RS1 and the second reflective surface RS2 each may include a plane, and the slope of the first reflective surface RS1 is less than the slope of the second reflective surface RS2. In detail, the bottom surface 112 of the body 110 is, for example, a plane, and the first reflective surface RS1 and the second reflective surface RS2 may incline relative to the bottom surface 112. In an embodiment, the slope S1 of the first reflective surface RS1 is, for example, between 0 and 1.5, so that the angle of the ray L1 emitted from the light outlet 1130 may be further reduced, and therefore, the ray L1 emitted from the light outlet 1130 is emitted at the approximately forward angle. Incidentally, in an embodiment, the slope S1 of the first reflective surface RS1 may be 0. In other words, the first reflective surface RS1 is, for example, a plane substantially parallel to the bottom surface 112 and may be located at the bottom 1131 of the light source groove 113, so that the light utilization ratio can be further improved, and therefore, the light-emitting brightness of the reflective element 100 is improved. In addition, in another embodiment, for example, in the reflective element 100*a* shown in FIG. 3, the second reflective surface RS2*a* of the body 110*a* can be adjacent to the light outlet 1130, and the second reflective surface RS2*a* may be perpendicular to the bottom surface 112. In other words, the slope S2*a* of the second reflective surface RS2*a* may approach infinity to be substantially perpendicular to the bottom surface 112.

As shown in FIG. 1 and FIG. 2 again, in the embodiment, the light outlets 1130 of the light source grooves 113 may be separated on the top surface 111. For example, there may be a distance G between the two adjacent light outlets 1130 in the light outlets 1130 on the top surface 111, and the distance G is, for example, between 0.01 mm and 2 mm. In detail, the distance G further can prevent the ray L1 emitted from one light outlet 1130 from passing through the upper side of another light outlet 1130. Thus, in the embodiment where the reflective element 100 is applied to the backlight module B, the reflective element 100 further can reduce interference of the ray L1 emitted from the bright area to the dark area when the backlight module B executes the local dimming function so that the bright and dark contrast is further enhanced when the backlight module B executes the local dimming function.

Figure 4:
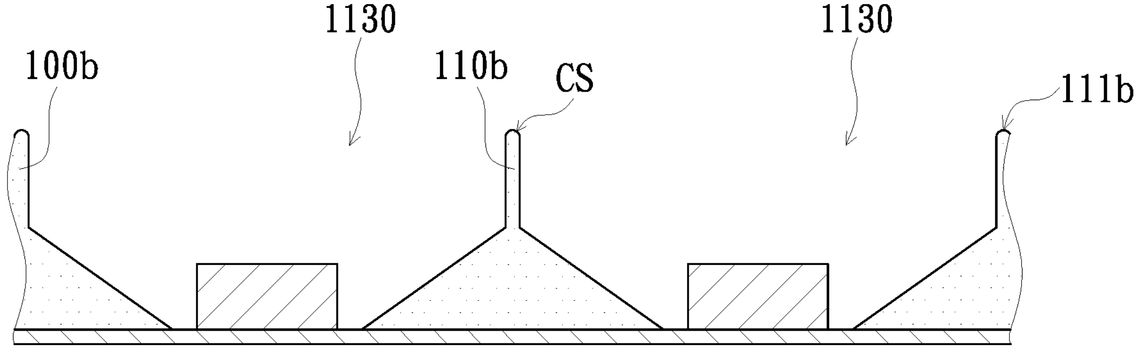
FIG. 4 is a schematic cross-sectional view of a reflective element in another embodiment of the present invention applied to a backlight module.

In an embodiment of the present invention, an area of the top surface 111 between the adjacent two light outlets 1130 may have a plane FS. As shown in FIG. 2 continuously, the plane FS is adjacent to the two reflective portions 1132 of the two adjacent light source grooves 113; and a sharp corner SA is formed between the plane and each of the two reflective portions 1132. In detail, the two sharp corners SA can shelter more rays L2 to be emitted from the light outlet 1130 at a large angle, so that the angle of the ray L1 emitted from the light outlet 1130 can be further reduced, and the ray L1 emitted from one light outlet 1130 can be further prevented from interfering with another adjacent light outlet 1130. However, in an embodiment, for example, in the reflective element 100*b* shown in FIG. 4, the top surface 111*b* of the top body 110*b* may include a curved surface CS. The curved surface CS is located between the two adjacent light outlets 1130 in the light outlets 1130. The curvature radius of the curved surface CS is, for example, between 0.01 mm and 2 mm. Thus, the curved surface CS can reflect the rays more uniformly, so that the light-emitting brightness of the reflective element 100*b* is more uniform, and it further has the advantage of being easily processed. Incidentally, the curved surface CS is, for example, formed by polishing the plane FS shown in FIG. 2, but the processing mode is not over-limited herein.

Figure 5:
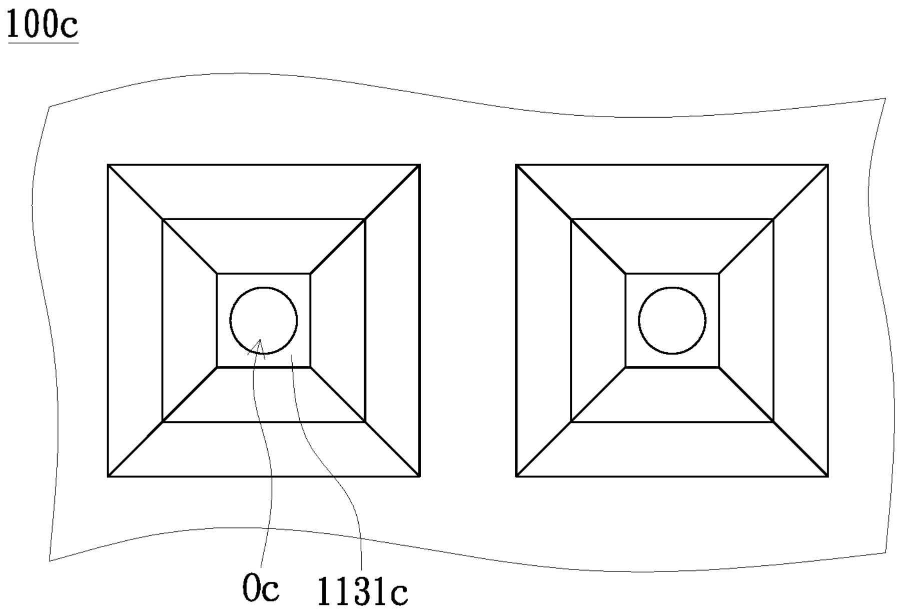
FIG. 5 is a schematic top view of an opening of the reflective element in another embodiment of the present invention.
Figure 6:
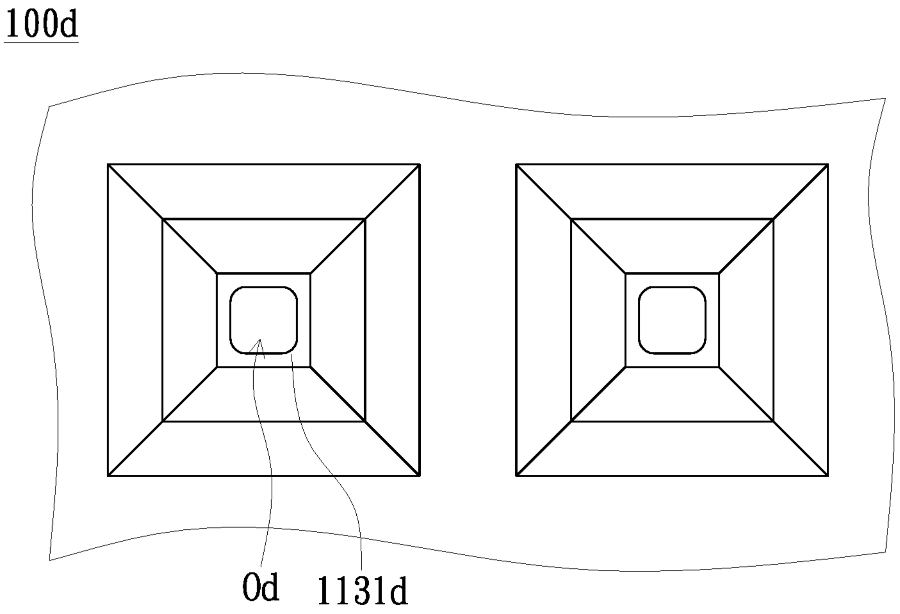
FIG. 6 is a schematic top view of an opening of the reflective element in another embodiment of the present invention.

As shown in FIG. 1 and FIG. 2 together again, in the embodiment, the light source groove 113 may extend from the top surface 111 of the body 110 to the bottom surface 112, and the bottom 1131 of the light source groove 113 is closer to the bottom surface 112 of the body 110 compared with the light outlet 1130. The bottom 1131 of each of the light source grooves 113 may be provided with an opening O. The opening O faces the light outlet 1130 and is adapted to arrange the light-emitting element L. The shape of the opening O may include a circle or a quadrangle. For example, as shown in FIG. 1, the opening O may be regularly quadrilateral, but the shape in other embodiments is not limited herein. In an embodiment, for example, in the reflective element 100*c* shown in FIG. 5, the opening Oc of the bottom 1131*c* may be round. In another embodiment, for example, in the reflective element 100*d* shown in FIG. 6, the opening Od of the bottom 1131*d* may be regularly quadrilateral with a rounded corner.

Compared with the known technology, according to the reflective element 100 in the embodiment, the first reflective surface RS1 and the second reflective surface RS2 surround the light-emitting element L of the backlight module B, wherein the slope S1 of the first reflective surface RS1 is different from the slope S2 of the second reflective surface RS2. Therefore, a light beam generated by the light-emitting element L can be emitted from the light outlet 1130 at an approximately forward light-emitting angle after being reflected by the first reflective surface RS1 and the second reflective surface RS2, so that the rays L1 emitted from the light outlets 1130 are prevented from interfering with each other. Based on the above structure, the reflective element 100 in the embodiment has the advantages of a small light-emitting angle and uniform light-emitting brightness.

As shown in FIG. 2 continuously, the backlight module B is, for example, the direct type backlight module. Specifically speaking, the light-emitting elements L may be arranged in an array on a support plate. It is worth noting that the peak angle of the light-emitting intensity of the light-emitting element L may be between about 50 degrees and 90 degrees. For example, in an embodiment, the peak angle of the light-emitting intensity of the light-emitting element L may be between about 70 degrees and 90 degrees. Thus, the ray L1 generated by the light emitting element L can be emitted from the light outlet 1130 at a smaller angle after being reflected by the first reflective surface RS1 and the second reflective surface RS2, so that the ray L1 emitted from the light outlet 1130 is emitted at the approximately forward light emitting angle. Therefore, the light-emitting element L and the reflective element 100 further can improve the bright and dark contrast when the backlight module B executes the local dimming function. Further, the light-emitting element L in the embodiment may be provided with the top T facing the light outlet 1130. The top T is, for example, provided with a shading cover or a distributed Bragg reflector (DBR), so that the peak angle of the light-emitting intensity of the light-emitting element L may be between about 50 degrees and 90 degrees. However, the present invention does not over-limit means to adjust the peak angle.

Incidentally, the light-emitting element L in the embodiment may include a light-emitting diode (LED). In an embodiment, the light-emitting element L may be a non-packaged light-emitting chip cut from a wafer, for example, a light-emitting diode chip. For example, the light-emitting diode chip may be a grain-sized nitride light-emitting diode chip emitting blue light at the main wavelength, which is not limited herein.

In the embodiment, the backlight module B may further include an optical diaphragm F which may be arranged opposite to the top surface 111 of the body 110. In detail, there may be one or more optical diaphragms F. In addition, the optical diaphragm F may include a diffuser plate, a diffuser sheet, a prismatic lens and/or a wavelength conversion sheet, and the like, which is not over-limited herein.

Figure 7:
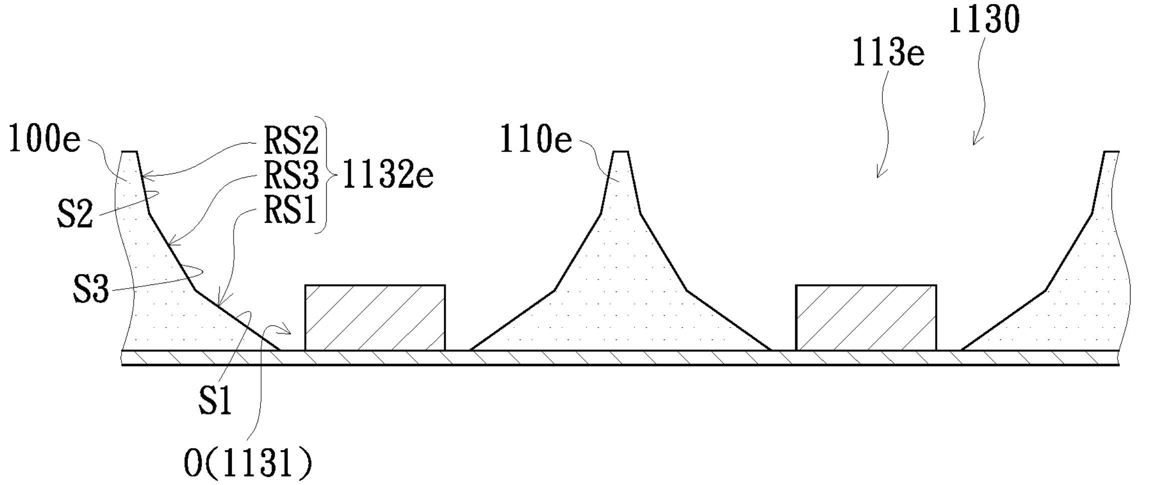
FIG. 7 is a schematic cross-sectional view of a reflective element in another embodiment of the present invention applied to a backlight module.

FIG. 7 is a schematic cross-sectional view of a reflective element in another embodiment of the present invention applied to a backlight module. The structure and advantages of the reflective element 100*e* in the embodiment are similar to those in the embodiment shown in FIG. 1, and the differences are merely described below. As shown in FIG. 7, the reflective portion 1132*e* of the body 110*e* may further include a third reflective surface RS3 located between the first reflective surface RS1 and the second reflective surface RS2. A slope S3 of the third reflective surface RS3 is different from the slope S1 of the first reflective surface RS1 and the slope S2 of the second reflective surface RS2. Therefore, the reflective portion 1132*e* can reduce the angle of the ray L1 emitted from the light outlet 1130, and the ray L1 emitted from the light outlet 1130 is emitted at the approximately forward angle. It can be understood that in other embodiments, the reflective portion 1132*e* may further include more reflective surfaces, and the slope of each reflective surface relative to the bottom surface 112 may gradually increase from a side, close to the bottom 1131, in the light source groove 113*e* to the light outlet 1130. For example, in the embodiment, the second reflective surface RS2 is closest to the light outlet 1130, and the first reflective surface RS1 is closest to the bottom 1131 (shown in FIG. 7 as the opening O); the slope S1 of the first reflective surface RS1 may be less than the slope S3 of the third reflective surface RS3, and the slope S3 of the third reflective surface RS3 may be less than the slope S2 of the second reflective surface RS2.

Figure 8:
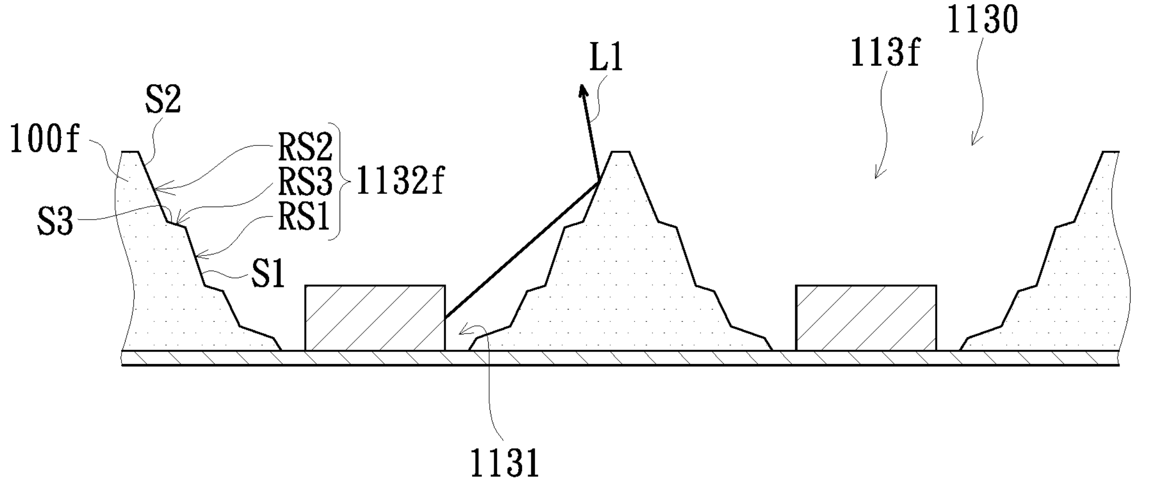
FIG. 8 is a schematic cross-sectional view of a reflective element in another embodiment of the present invention applied to a backlight module.
Figure 9:
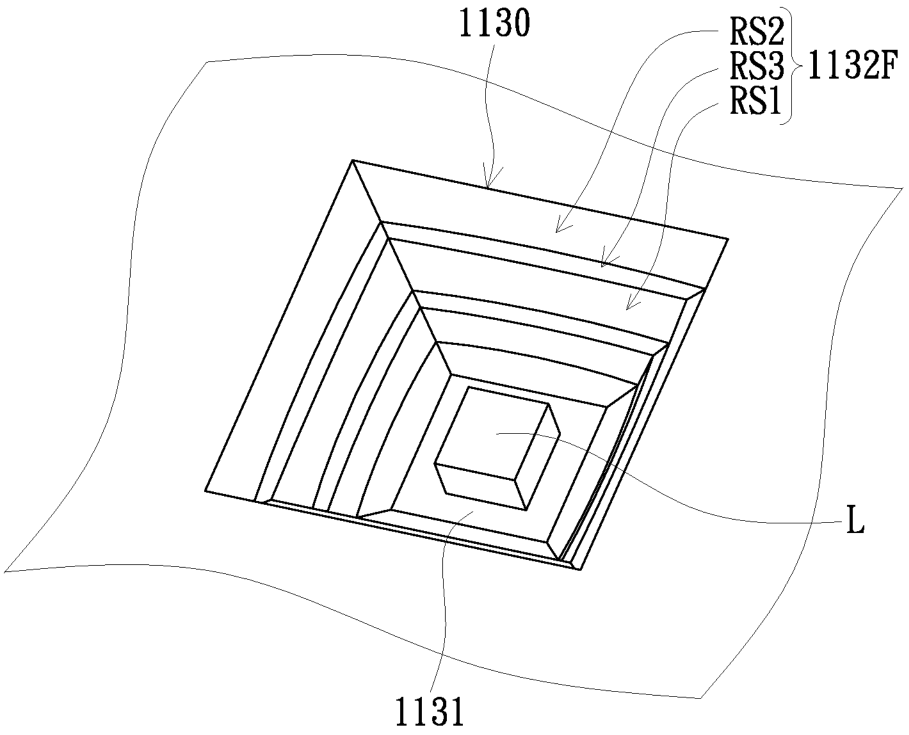
FIG. 9 is a schematic three-dimensional view of the reflective element in FIG. 8 applied to the backlight module.

FIG. 8 is a schematic cross-sectional view of a reflective element in another embodiment of the present invention applied to a backlight module. FIG. 9 is a schematic three-dimensional view of the reflective element in FIG. 8 applied to the backlight module. The structure and advantages of the reflective element 100*f* in the embodiment are similar to those in the embodiment shown in FIG. 7, and the differences are merely described below. As shown in FIG. 8 and FIG. 9, the third reflective surface RS3 may be adjacent to the first reflective surface RS1 and the second reflective surface RS2, and the slope S3 of the third reflective surface RS3 may be greater than or less than the slope S1 of the first reflective surface RS1 and the slope S2 of the second reflective surface RS2. For example, in the embodiment, the slope S3 of the third reflective surface RS3 may be less than the slope S1 of the first reflective surface RS1 and the slope S2 of the second reflective surface RS2. Therefore, the reflective portion 1132*f* of the body 110*f* can reduce the angle of the ray L1 emitted from the light outlet 1130, and the ray L1 emitted from the light outlet 1130 is emitted at the approximately forward angle. For example, in an embodiment, the peak angle of the light-emitting brightness of the light-emitting element L may be between about 50 degrees and 90 degrees, and the reflective portion 1132*f* can guide the ray L1 with the light-emitting angle between 50 degrees and 90 degrees to be emitted from the light outlet 1130 at a small angle. It is to be noted that in the direction from the bottom 1131 of the light source groove 113*f* to the light outlet 1130, the slopes of the reflective surfaces may alternate in magnitude. For example, in the embodiment, the first reflective surface RS1 is closest to the bottom 1131, and the second reflective surface RS2 is closest to the light outlet 1130, wherein the slope S1 of the first reflective surface RS1 may be substantially equal to the slope S2 of the second reflective surface RS2, and the slope S3 of the third reflective surface RS3 may be less than the slope S1 of the first reflective surface RS1 and the slope S2 of the second reflective surface RS2. It can be understood that in an embodiment, the slope S3 of the third reflective surface RS3 may be greater than the slope S1 of the first reflective surface RS1 and the slope S2 of the second reflective surface RS2.

Figure 10:
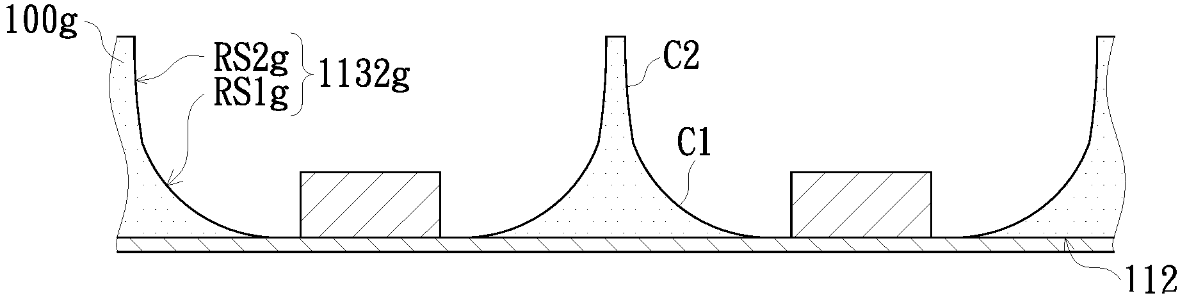
FIG. 10 is a schematic cross-sectional view of a reflective element in another embodiment of the present invention applied to a backlight module.
Figure 11:
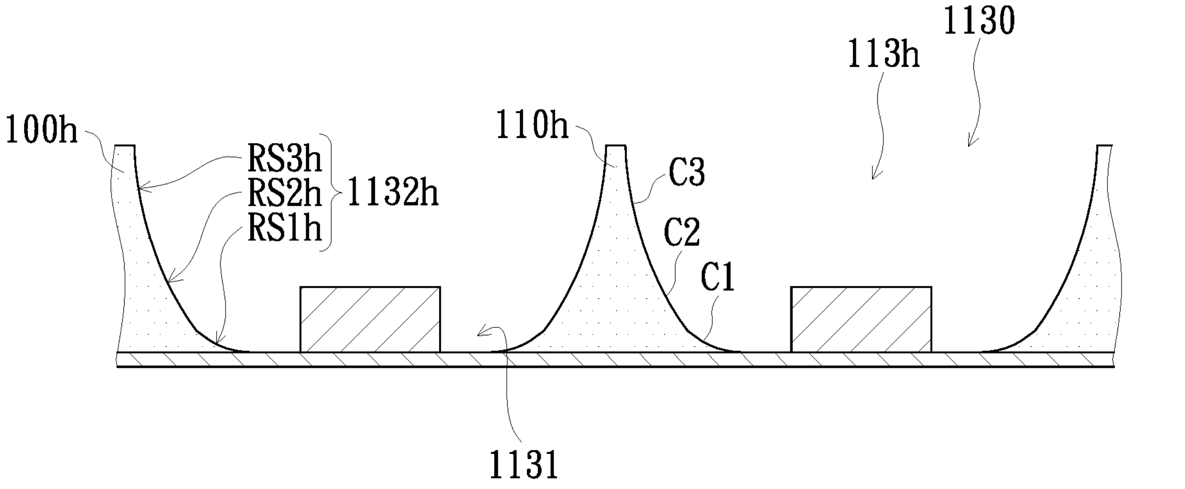
FIG. 11 is a schematic cross-sectional view of a reflective element in another embodiment of the present invention applied to a backlight module.
Figure 12:
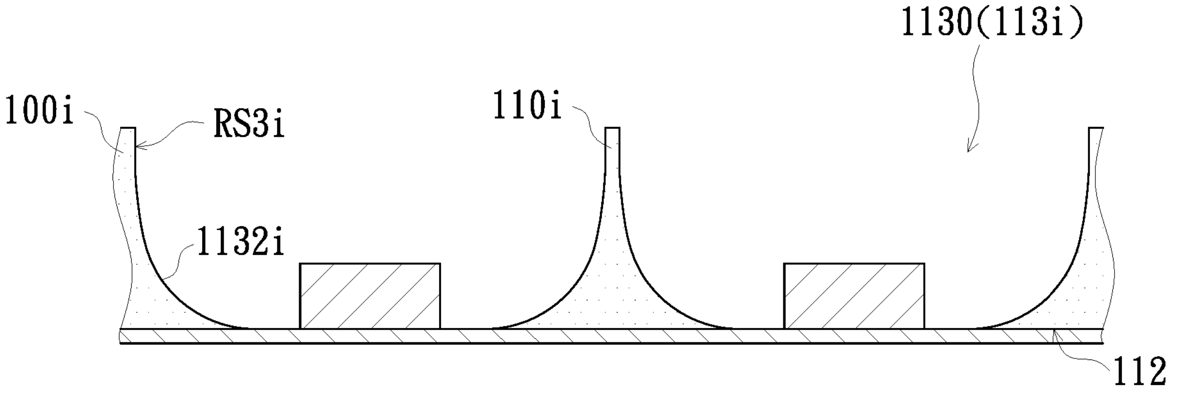
FIG. 12 is a schematic cross-sectional view of a reflective element in another embodiment of the present invention applied to a backlight module.

FIG. 10 is a schematic cross-sectional view of a reflective element in another embodiment of the present invention applied to a backlight module. FIG. 11 is a schematic cross-sectional view of a reflective element in another embodiment of the present invention applied to a backlight module. FIG. 12 is a schematic cross-sectional view of a reflective element in another embodiment of the present invention applied to a backlight module. As shown in FIG. 10, the structure and advantages of the reflective element 100*g* in the embodiment are similar to those in the embodiment shown in FIG. 1, and the differences are merely described below. The first reflective surface RS1*g* and the second reflective surface RS2*g* each may include a curved surface, and the curvature C2 of the second reflective surface RS2*g* is different from the curvature C1 of the first reflective surface RS1*g*. For example, in the embodiment, the curvature C2 of the second reflective surface RS2*g* may be less than the curvature C1 of the first reflective surface RS1*g*. In detail, in an embodiment, the curvature C2 of the second reflective surface RS2*g* may approach to 0; in other words, the second reflective surface RS2*g* may be substantially perpendicular to the bottom surface 112. It can be understood that although the reflective portion 1132*g* in the embodiment includes two reflective surfaces, i.e., the first reflective surface RS1*g* and the second reflective surface RS2*g*, the structure of the reflective portion 1132*g* is not limited herein. In an embodiment, for example, in the reflective element 100*h* shown in FIG. 11, the reflective portion 1132*h* of the body 110 may, for example, further include the third reflective surface RS3*h*. The third reflective surface RS3*h* is located between the second reflective surface RS2*h* and the light outlet 1130 and is adjacent to the light outlet 1130. Further, the curvatures of the reflective surfaces may gradually decrease from the bottom 1131 of the light source groove 113*h* to the light outlet 1130. For example, in the embodiment, the third reflective surface RS3*h* may be closest to the light outlet 1130, and the first reflective surface RS1*h* may be closest to the bottom 1131, wherein the curvature C3 of the third reflective surface RS3*h* may be less than the curvature C2 of the second reflective surface RS2*h*, and the curvature C2 of the second reflective surface RS2*h* may be less than the curvature C1 of the first reflective surface RS1*h*. Incidentally, in another embodiment, for example, in the reflective element 100*i* shown in FIG. 12, the third reflective surface RS3*i* may be perpendicular to the bottom surface 112. In other words, the third reflective surface RS3*i* and the bottom surface 112 both may be planes and may be substantially perpendicular to each other. Therefore, the reflective portion 1132*i* of the body 110*i* further can prevent the ray emitted from one light outlet 1130 from passing through the upper side of another light outlet 1130, so that the ray is prevented from interfering with another adjacent light source groove 113*i*.

Figure 13:
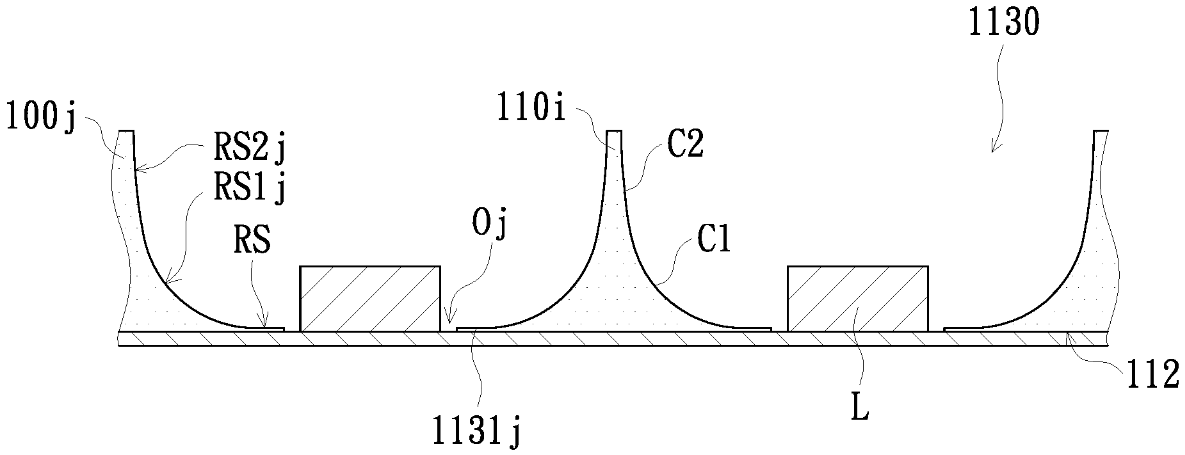
FIG. 13 is a schematic cross-sectional view of a reflective element in another embodiment of the present invention applied to a backlight module.

FIG. 13 is a schematic cross-sectional view of a reflective element in another embodiment of the present invention applied to a backlight module. The structure and advantages of the reflective element 100*j* in the embodiment are similar to those in the embodiment shown in FIG. 1, and the differences are merely described below. As shown in FIG. 13, the bottom 1131*j* may be provided with the reflective surface RS. The reflective surface RS has an opening Oj facing the light outlet 1130 and the opening Oj is adapted to arrange the light-emitting element L. The first reflective surface RS1*j* is located between the second reflective surface RS2*j* and the reflective surface RS. The reflective surface RS is parallel to the bottom surface 112 of the body 110*j* so that the light utilization ratio of the reflective element 100*j* on the light-emitting element L can also be improved. In detail, the reflective surface RS and the bottom surface 112 are, for example, planes which may be substantially parallel to each other. In the embodiment, the reflective surface RS may be opposite to the bottom surface 112, and faces, for example, the light outlet 1130. In an embodiment, the reflective surface RS may be curved, and the curvature C2 of the second reflective surface RS2*j* may be less than the curvature C1 of the first reflective surface RS1*j* and the curvature of the reflective surface RS. For example, the curvature of the reflective surface RS may be substantially equal to the curvature C1 of the first reflective surface RS1*j*. In other words, the reflective surface RS may be substantially parallel to the bottom surface 112.

In conclusion, according to the reflective element provided by the present invention, the first reflective surface and the second reflective surface surround the light-emitting element of the backlight module, wherein the slope of the first reflective surface is greater than the slope of the second reflective surface or the curvature of the first reflective surface is less than the curvature of the second reflective surface. Therefore, a light beam generated by the light-emitting element can be emitted from the light outlet at an approximately forward light-emitting angle after being reflected by the first reflective surface and the second reflective surface, so that the rays emitted from the light outlets are prevented from interfering with each other. Based on the above structure, the reflective element provided by the present invention has the advantages of a small light-emitting angle and uniform light-emitting brightness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation to encompass all such modifications and similar structures.

What is claimed is:

1. A reflective element, adapted to a backlight module, wherein the backlight module comprises a plurality of light-emitting elements, and the reflective element comprises:

a body, provided with a top surface, a bottom surface, and a plurality of light source grooves, wherein the top surface is opposite to the bottom surface, each of the light source grooves is provided with a light outlet, a bottom, and a reflective portion, the light outlets are formed on the top surface, the bottoms are opposite to the light outlets and are adapted to arrange the light-emitting elements, the reflective portions are located between the light outlets and the bottoms and are adapted to surround the light-emitting elements, each of the reflective portions comprises a first reflective surface and a second reflective surface, the first reflective surface is located between the second reflective surface and the bottom, and the second reflective surface is located between the first reflective surface and the light outlet;

wherein a slope of the first reflective surface relative to the bottom surface is different from a slope of the second reflective surface relative to the bottom surface, or a curvature of the first reflective surface is different from a curvature of the second reflective surface;

wherein the first reflective surface and the second reflective surface each comprise a plane, and the slope of the first reflective surface is less than the slope of the second reflective surface;

wherein the reflective portion further comprises a third reflective surface, the third reflective surface is located between the first reflective surface and the second reflective surface, and a slope of the third reflective surface relative to the bottom surface is different from the slope of the first reflective surface and the slope of the second reflective surface;

wherein the third reflective surface is adjacent to the first reflective surface and the second reflective surface, and the slope of the third reflective surface is greater than or less than the slope of the first reflective surface and the slope of the second reflective surface;

wherein the third reflective surface comprises a plane;

wherein there is a distance between the two adjacent light outlets in the light outlets on the top surface, and the distance is between 0.01 mm and 2 mm;

wherein there is a plane in an area between the two adjacent light outlets on the top surface, the plane is adjacent to the two reflective portions of the two adjacent light source grooves, and a sharp corner is formed between the plane and each of the two reflective portions.

2. The reflective element according to claim 1, wherein the slope of the first reflective surface is between 0 and 1.5.

3. The reflective element according to claim 1, wherein the bottoms of the light source grooves each is provided with an opening, the opening faces the light outlet and is adapted to arrange the light-emitting element, and a shape of the opening comprises a circle or a quadrilateral.

* * * * *